(12) United States Patent
Sugai

(10) Patent No.: US 8,490,079 B2
(45) Date of Patent: Jul. 16, 2013

(54) INFORMATION PROCESSING APPARATUS AND INSTALLATION METHOD

(75) Inventor: Yousuke Sugai, Kawasaki (JP)

(73) Assignee: Canon Kabushiki Kaisha (JP)

( * ) Notice: Subject to any disclaimer, the term of this patent is extended or adjusted under 35 U.S.C. 154(b) by 884 days.

(21) Appl. No.: 12/464,952

(22) Filed: May 13, 2009

(65) Prior Publication Data

US 2009/0300600 A1    Dec. 3, 2009

(30) Foreign Application Priority Data

May 30, 2008  (JP) ................................ 2008-143622

(51) Int. Cl.
  *G06F 9/445*    (2006.01)

(52) U.S. Cl.
  USPC ............................ 717/174; 717/175; 717/176

(58) Field of Classification Search
  None
  See application file for complete search history.

(56) References Cited

U.S. PATENT DOCUMENTS

| | | | | |
|---|---|---|---|---|
| 7,398,480 B2* | 7/2008 | Zimniewicz et al. | ......... | 717/176 |
| 7,496,913 B2* | 2/2009 | Hayes et al. | ................... | 717/174 |
| 7,895,593 B2* | 2/2011 | Curtis | ........................... | 717/175 |
| 2006/0031172 A1 | 2/2006 | Otsuka | | |
| 2006/0265707 A1* | 11/2006 | Hayes et al. | ................... | 717/174 |
| 2007/0079005 A1* | 4/2007 | Jasen et al. | ..................... | 717/174 |
| 2007/0244987 A1* | 10/2007 | Pedersen et al. | ............... | 717/175 |
| 2008/0046371 A1* | 2/2008 | He et al. | ......................... | 717/176 |
| 2009/0064135 A1* | 3/2009 | Jimmerson | .................... | 717/174 |

FOREIGN PATENT DOCUMENTS

| | | |
|---|---|---|
| JP | 11-353187 A | 12/1999 |
| JP | 2005-100083 A | 4/2005 |
| JP | 2006-48527 A | 2/2006 |

OTHER PUBLICATIONS

Installation (computer programs) From Wikipedia, the free encyclopedia [retrieved on Apr. 13, 2012]. Retrieved from the Internet<URL: http://en.wikipedia.org/wiki/Installation_(computer_programs)>.*

* cited by examiner

*Primary Examiner* — Matt Kim
*Assistant Examiner* — Hua Lu
(74) *Attorney, Agent, or Firm* — Rossi, Kimms & McDowell LLP

(57) ABSTRACT

The installation of multiple applications by an installer is executed in a mode that does not display an error message in a display device. Upon an installation performed by the installer ending, the result of the installation performed by the installer is determined. As a result of the determination, an installer that failed at the installation is caused to re-execute the installation of the application whose installation failed in a mode that displays an error message in the display device. As a result of the re-execution, an error message is displayed in the display device by the installer that failed at the installation.

8 Claims, 21 Drawing Sheets

FIG. 3

| APPLICATION NAME | HAS END USER LICENSE AGREEMENT HIDDEN MODE ? | PROVIDES OWN ERROR MESSAGE UPON INSTALLATION FAILURE ? | END USER LICENSE AGREEMENT |
|---|---|---|---|
| APPLICATION A | YES | YES | AGREEMENT A |
| APPLICATION B | YES | NO | AGREEMENT B |
| APPLICATION C | NO | NO | AGREEMENT B |

FIG. 9

XXXX company PHOTO PRINTING APPLICATION A — 901

END USER LICENSE AGREEMENT

THANK YOU FOR CHOOSING PHOTO PRINTING APPLICATION A.

PLEASE READ THE FOLLOWING LICENSE AGREEMENT CAREFULLY. IF YOU AGREE WITH THIS LICENSE AGREEMENT, SELECT "I AGREE". IF YOU DO NOT AGREE WITH THIS LICENSE AGREEMENT, SELECT "I DO NOT AGREE". SELECTING "I AGREE" WILL INSTALL THIS SOFTWARE ON YOUR COMPUTER.

— 902

I DO NOT AGREE — 903

I AGREE — 904

| APPLICATION NAME | HAS SILENT INSTALLATION MODE ? | END USER LICENSE AGREEMENT |
|---|---|---|
| APPLICATION A | YES | AGREEMENT A |
| APPLICATION B | YES | AGREEMENT B |
| APPLICATION C | NO | |
| APPLICATION D | YES | AGREEMENT D |
| APPLICATION E | NO | |
| APPLICATION F | YES | AGREEMENT F |

| APPLICATION NAME | INSTALLATION CONFIRMATION ITEMS ||
| | INSTALLATION OS | BASIC INCREASED USAGE AMOUN (MB) |
| --- | --- | --- |
| APPLICATION A | Windows2000, XP | 20 |
| APPLICATION B | Windows2000 | 5 |
| APPLICATION C | Windows2000, XP | 150 |

| APPLICATION NAME | INSTALLATION CONFIRMATION ITEMS ||||||
| | INSTALLATION PATH | START MENU NAME | DESKTOP SHORTCUT NAME | REGISTRY WHERE APPLICATION IS REGISTERED | REGISTRY WHERE UNINSTALLER IS REGISTERED |
| --- | --- | --- | --- | --- | --- |
| APPLICATION A | C:¥Program Files¥ApliA | ApliA | ApliA | Software¥ApliA | System¥Uninstaller¥ApliA |
| APPLICATION B | C:¥Program Files¥ApliB | ApliB | ApliB | Software¥ApliB | System¥Uninstaller¥ApliB |
| APPLICATION C | C:¥Program Files¥ApliC | ApliC | ApliC | Software¥ApliC | System¥Uninstaller¥ApliC |

INFORMATION PROCESSING APPARATUS AND INSTALLATION METHOD

CROSS-REFERENCE TO RELATED APPLICATION

This application claims the benefit of Japanese Patent Application No. 2008-143622, filed May 30, 2008, which is hereby incorporated by reference herein in its entirety.

BACKGROUND OF THE INVENTION

1. Field of the Invention

The present invention relates to an information processing apparatus and an installation method for installing multiple applications at once using an installer that has a function for installing applications.

2. Description of the Related Art

Conventionally, when installing multiple applications in an information processing apparatus, the installation is generally performed using one of the following two programs. One is a program that has a function for installing a single application in the information processing apparatus (a standalone installer). The other is a program that calls multiple standalone installers in order (an integrated installer). All the applications are installed by the integrated installer executing the standalone installers in order.

Each standalone installer typically prompts a user to perform various operations at the time of execution, such as the display of and agreement/disagreement with an end user license agreement, the specification of the installation destination folder, and so on. Therefore, there is a problem in that when the integrated installer calls multiple standalone installers, the amount of effort required by the user to make such inputs increases as more standalone installers are called, placing a burden on the user.

Accordingly, Japanese Patent Laid-Open No. 2006-048527 discloses a method in which information to be input by a user is saved in a specific location in advance and installation is carried out based on that information in order to eliminate the effort required by the user to make inputs for each standalone installer. Through this method, the installation can be performed without requiring unnecessary effort on the part of the user.

Meanwhile, Japanese Patent Laid-Open No. 2005-100083 discloses a method for eliminating effort on the part of a user by not displaying windows for the end user license agreements or installation destination specifications of individual installers, or displaying such windows but proceeding to the next window after a set amount of time.

When installing multiple applications using an integrated installer, there may be situations where not all the applications have the same specifications. For example, the specifications of the standalone installers for three types of applications (X, Y, and Z) are sometimes different.

Accordingly, Japanese Patent Laid-Open No. H11-353187 discloses a method in which the specifications of multiple types of standalone installers are unified so as to provide an integrated installer with error codes that have been unified in advance. The integrated installer can then check those error codes and display a predetermined error message.

However, Japanese Patent Laid-Open No. 2006-048527 has a limitation in that it is necessary to save the information to be input by a user in a specific location in advance. There is a further problem in that such information does not yet exist when performing the first installation, and thus the information ultimately must be input.

Meanwhile, Japanese Patent Laid-Open No. 2005-100083 has a problem in that if the user is not looking at the screen, the installer will assume that the user has agreed with the end user license agreement even if s/he has not agreed therewith. Furthermore, even if an error occurs during the installation process and the installation fails, the process will nevertheless advance on its own. Such a case poses a problem in that even if the reason for the failure is displayed on the screen, the process will advance to the next screen while the user is not looking, and thus the user cannot know what the reason for the failure was.

Furthermore, in Japanese Patent Laid-Open No. H11-353187, it is necessary to modify all of the multiple standalone installers whose specifications originally are different. Thus there is a problem in that because the unification of error codes deals with the fundamentals of the specifications, the stated modifications involve many man-hours for development, a high cost, and so on. Moreover, depending on the standalone installer, there are cases where circumstances render the modification impossible, and therefore this method cannot be used in such cases. Finally, if a special problem hitherto unrecognized has been found in a certain standalone installer and that problem cannot be expressed by any of the error codes defined thus far, it is necessary to revise the error codes. In such a case, modifications based on new specifications are required not only in the standalone installer in question, but in the other standalone installers and the integrated installer as well. The result is a problem in that a minor modification ultimately affects the entire system.

SUMMARY OF THE INVENTION

The present invention provides an information processing apparatus that is able to display an error message in a case where the installation of an application has failed during the silent installation of multiple applications using an installer.

One aspect of the present invention provides an information processing apparatus that installs multiple applications using an installer that has a function for installing applications, the apparatus comprising: an execution unit that causes the installer to execute the installation of the multiple applications in a mode that does not display an error message in a display device; a determination unit that determines the result of the installation of an application upon the installation of the application performed by the installer ending; and a re-execution unit that, in a case where the determination unit has determined that the installation of the application has failed, re-executes the installation of the application whose installation failed in a mode that displays an error message in the display device, wherein the error message is displayed in the display device as a result of the re-execution.

Another aspect of the present invention provides an installation method for an information processing apparatus that installs multiple applications using an installer that has a function for installing applications, the method comprising: causing the installer to execute the installation of the multiple applications in a mode that does not display an error message in a display device; determining the result of the installation of an application upon the installation of the application performed by the installer ending; and re-executing, in the case where the step of determining has determined that the installation of the application has failed, the installation of the application whose installation failed in a mode that displays an error message in the display device, wherein the error message is displayed in the display device as a result of the re-execution.

Further features of the present invention will become apparent from the following description of exemplary embodiments (with reference to the attached drawings).

BRIEF DESCRIPTION OF THE DRAWINGS

FIG. 3 is a diagram illustrating an example of the structure of an application information table according to the first embodiment.

FIG. 9 is a diagram illustrating an example of the display of an end user license agreement according to the first embodiment.

FIG. 12 is a diagram illustrating whether or not applications have silent installation modes.

FIG. 14 is a diagram illustrating an application information table that defines how much the used space on a hard disk has increased and what sort of data is created in the system, when applications have been successfully installed.

DESCRIPTION OF THE EMBODIMENTS

Preferred embodiments for carrying out the present invention shall be described in detail hereinafter with reference to the drawings.

First Embodiment

Figure 1:
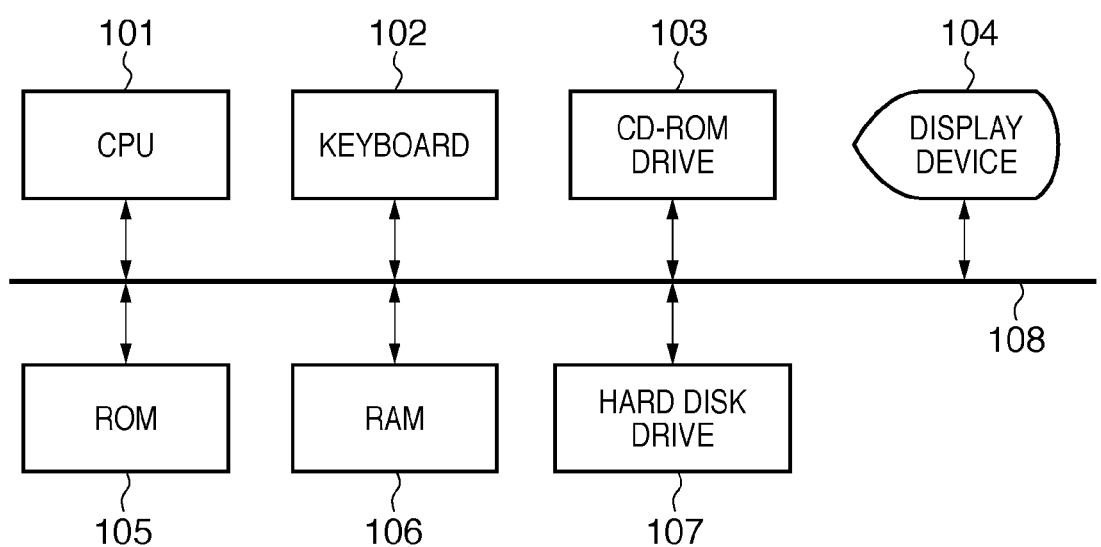
FIG. 1 is a diagram illustrating an example of the hardware configuration for implementing an integrated installer according to a first embodiment.

FIG. 1 is a diagram illustrating an example of the hardware configuration for implementing an integrated installer according to a first embodiment. Although a general computer system (information processing apparatus) such as a personal computer is described as an example hereinafter, the system may be configured from dedicated hardware.

Reference numeral 101 is a control unit (CPU) that controls the system as a whole. Reference numeral 102 is a keyboard for inputting various kinds of data. Reference numeral 104 is a color display device that displays image data stored in a RAM 106. The keyboard 102 and the display device 104 function as a user interface. The keyboard 102 may also include a mouse for specifying buttons and the like displayed in the display device 104.

Reference numeral 105 is a ROM that stores control procedures for controlling the overall system as well as other necessary information in advance. Reference numeral 106 is a RAM configured of a work area and various types of tables used when the CPU 101 executes programs.

Reference numeral 107 is a hard disk drive to and from which various types of data are written and read, and in which programs are stored. Reference numeral 108 is a system bus used for transferring various types of data. Reference numeral 103 is a CD-ROM drive.

The hard disk drive 107 and the CD-ROM drive 103 shall be referred to collectively as an external storage device; application programs, installers, printer drivers, and so on are stored therein, and are loaded into the RAM 106 and controlled by the CPU 101.

Figure 2:
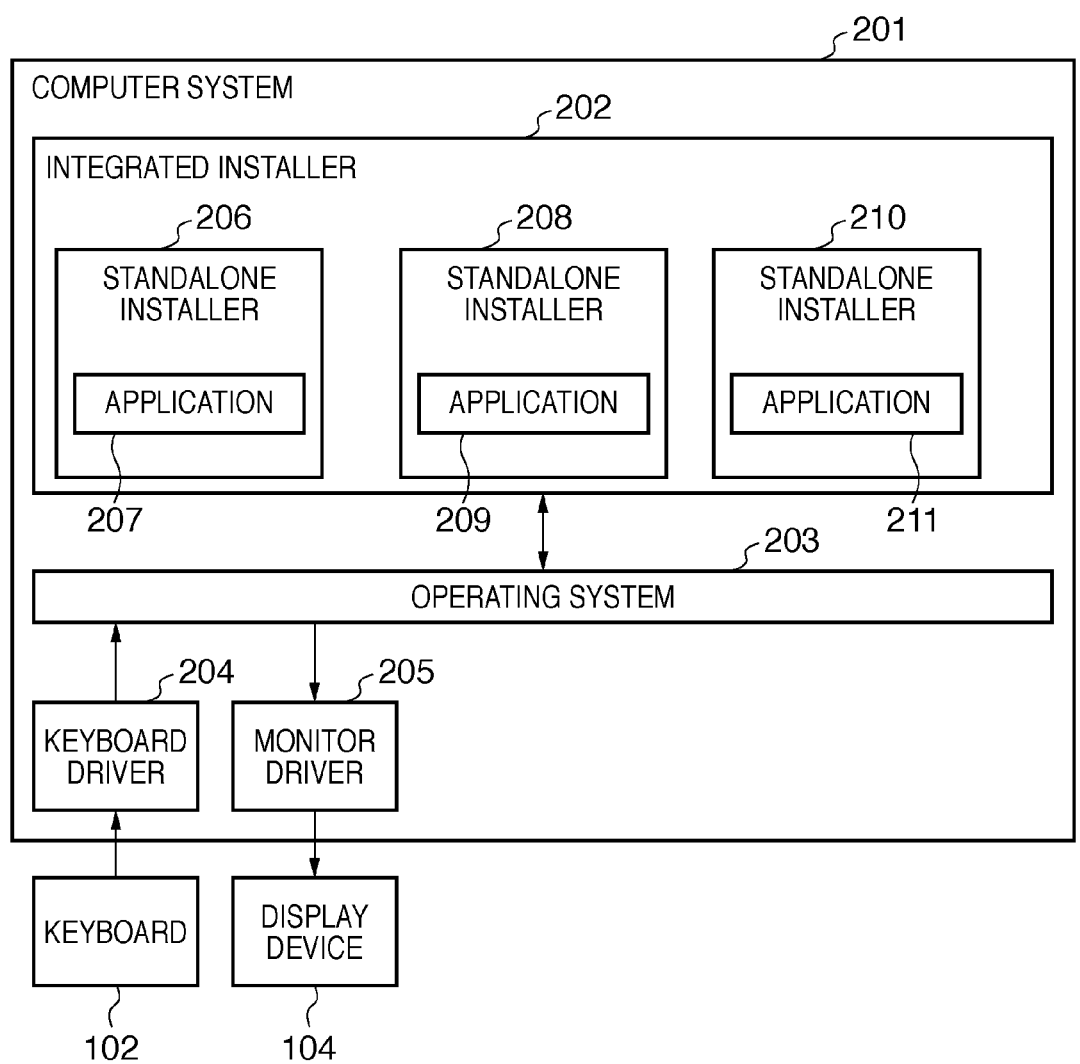
FIG. 2 is a diagram illustrating an example of the software configuration of a computer system according to the first embodiment.

FIG. 2 is a diagram illustrating an example of the software configuration of a computer system according to the first embodiment. Reference numeral 201 is a computer system in which various programs are running. Reference numeral 203 is an operating system that is at the center of the computer system 201. Reference numeral 204 is a keyboard driver that, when a user operates the keyboard 102, receives the results of those operations and communicates those results to the operating system 203. Reference numeral 205 is a monitor driver; the operating system 203 provides commands to the monitor driver 205, thereby displaying, in the display device 104, information that is to be presented to the user.

Reference numeral 202 is an integrated installer that installs applications in the operating system 203 by executing multiple standalone installers contained within itself. Reference numerals 206, 208, and 210 are standalone installers that contain separate applications 207, 209, and 211, respectively. Upon being called by the integrated installer 202, the standalone installers 206, 208, and 210 install, in the operating system 203, the applications 207, 209, and 211 respectively contained therein.

Therefore, installing the applications 207, 209, and 211 in the operating system 203 enables a user to use various functions.

FIG. 3 is a diagram illustrating an example of the structure of an application information table according to the first embodiment. Reference numeral 300 is a table, held by the integrated installer 202, in which is written information necessary when executing the processes of the standalone installer 206, 208, and 210. This information includes items such as those described hereinafter:

what sort of mode the standalone installer of each application (301) has (302);
whether or not to display an error message in the case where installation fails during installation using a silent installation mode (303); and
the type of the end user license agreement (304).

Next, the basic flow of processing performed when the integrated installer 202 causes the standalone installers 206, 208, and 210 to install the applications 207, 209, and 211, respectively, under a configuration as described above, shall be described using FIG. 4.

Figure 4:
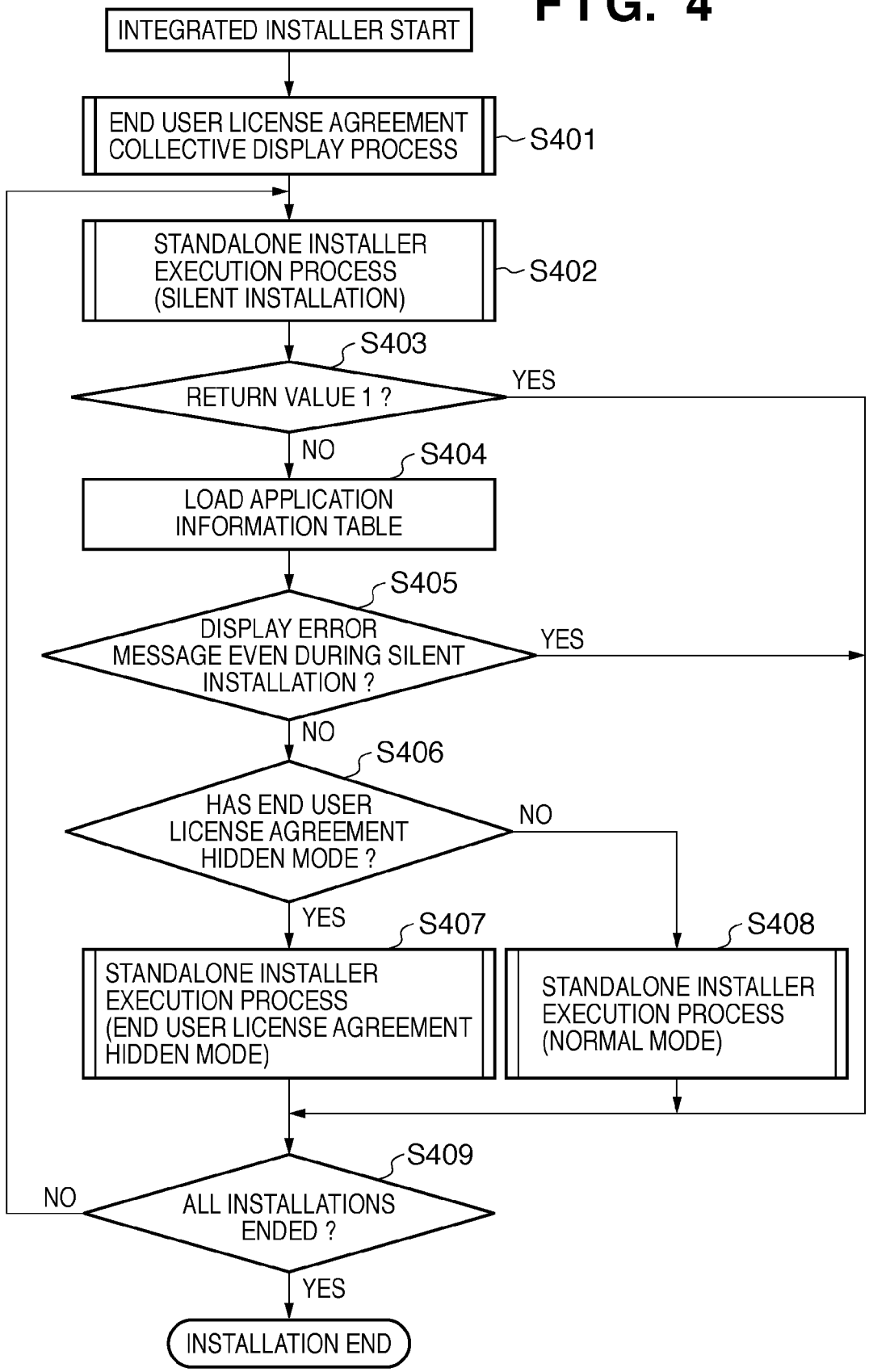
FIG. 4 is a flowchart illustrating a processing procedure of an integrated installer according to the first embodiment.

FIG. 4 is a flowchart illustrating a processing procedure of an integrated installer according to the first embodiment. When the integrated installer 202 is launched, an end user license agreement collective display process is carried out in S401. The details of this end user license agreement collective display process shall be described later. When the applications to be installed are determined as a result of the end user license agreement collective display process, the processing advances to S402, where a process for executing a standalone installer in a silent installation mode is carried out. The details of this standalone installer execution process shall be given later.

Next, in S403, it is determined whether or not the return value, which is the processing result of the standalone installer execution process, is "1". Here, a return value of "1" indicates that the application installation has succeeded. When the result of the determination indicates that the return value is "1", the processing advances to S409, whereas when the return value is not "1", the processing advances to S404.

In S404, the information 302 to 304 of the application whose installation was performed in S402 is loaded from the application information table 300 indicated in FIG. 3.

Then, in S405, it is determined whether or not that standalone installer is of a type that displays an error message by itself even when in silent installation mode. When the application information 303 is "Yes", it is determined that the standalone installer is of a type that displays an error message by itself (Yes in S405), and the processing advances to S409.

However, when the application information 303 is "No", it is determined that the standalone installer is of a type that does not display an error message when in silent installation mode (No in S405), and the processing advances to S406. In S406, it is determined whether or not the standalone installer has an end user license agreement hidden mode. When the application information 302 is "Yes", it is determined that the standalone installer has an end user license agreement hidden mode (Yes in S406), and the processing advances to S407. In S407, the standalone installer execution process is performed in the end user license agreement hidden mode, and the processing advances to S409.

However, when the application information 302 is "No", it is determined that the standalone installer does not have an end user license agreement hidden mode (No in S406), and the processing advances to S408. In S408, the standalone installer execution process is performed in the normal mode, and the processing advances to S409. Accordingly, in S408, an error message can be displayed by re-executing, in the normal mode, the installation of a standalone installer whose installation failed.

Next, in S409, it is determined whether or not all the installations have ended. Here, in the case where there is a standalone installer that has not yet been executed (No in S409), the processing returns to the abovementioned S402, and the processing described thus far is repeated. However, in the case where all the installations have ended (Yes in S409), the processing of this integrated installer ends.

Figure 5:
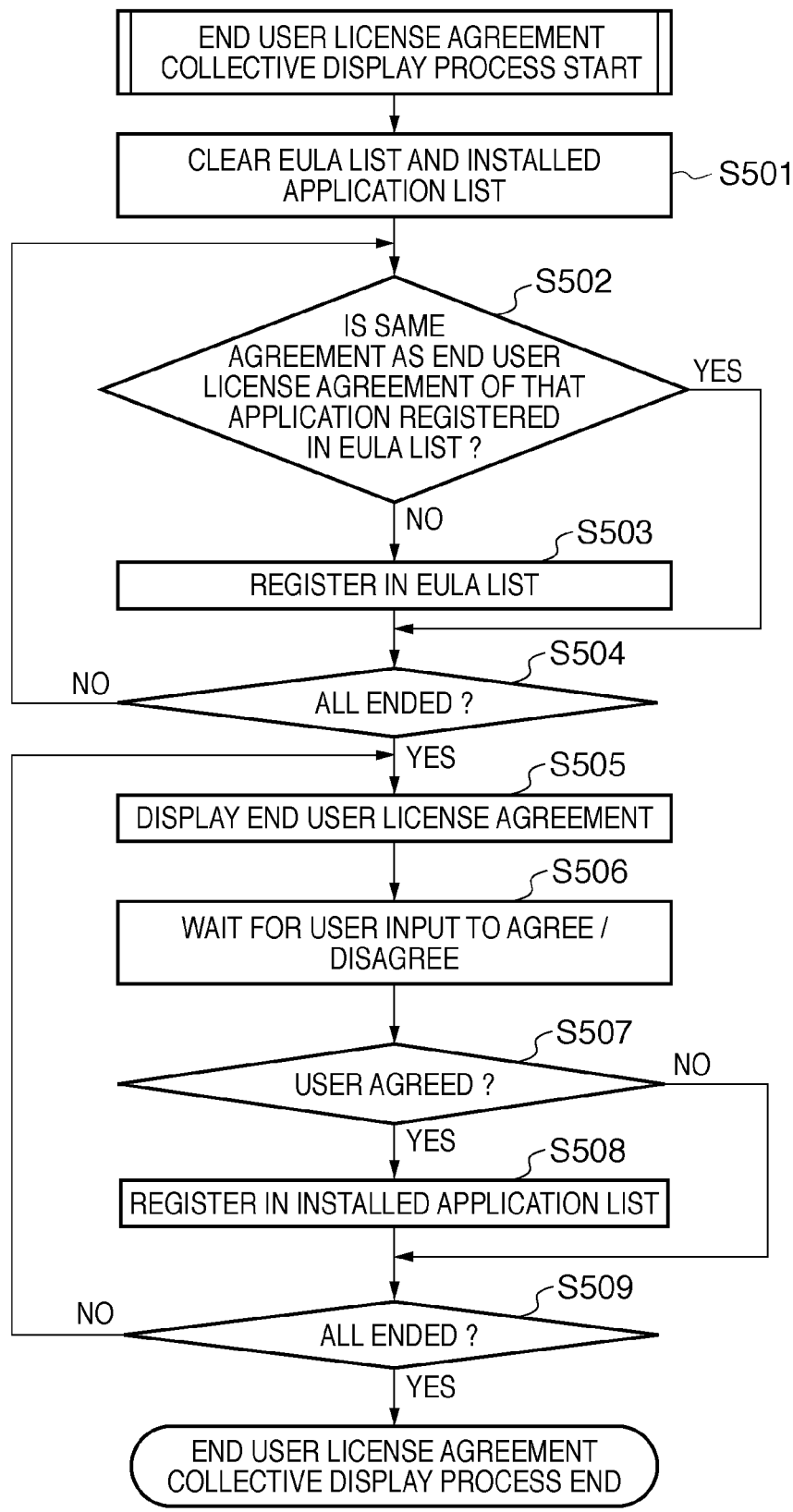
FIG. 5 is a flowchart illustrating an end user license agreement collective display process (S401) shown in FIG. 4.

FIG. 5 is a flowchart illustrating the end user license agreement collective display process (S401) shown in FIG. 4. When the end user license agreement collective display process commences, the contents of an EULA list and an installed application list are cleared in S501. The EULA list mentioned here is a list for storing which applications' end user license agreements to display. The installed application list, meanwhile, is a list for storing the applications that are to actually be installed based on inputs made by a user regarding whether that user has accepted or rejected each end user license agreement.

Next, in S502, it is checked whether or not the same agreement as the end user license agreement of an application supplied with the integrated installer is already registered in the EULA list. In the case where the agreement is not yet registered (No in S502), the processing advances to S503, where that end user license agreement is registered in the EULA list. Note that whether or not the end user license agreement of a certain application is the same end user license agreement as that of another application is confirmed by referring to the information 304 of the application information table 300 shown in FIG. 3.

In the case where the agreement is already registered (Yes in S502), the processing advances to S504, skipping the processing of S503. In S504, the following processing is performed for each of the end user license agreements registered in the EUAL list created through the processing performed thus far.

Figure 6:
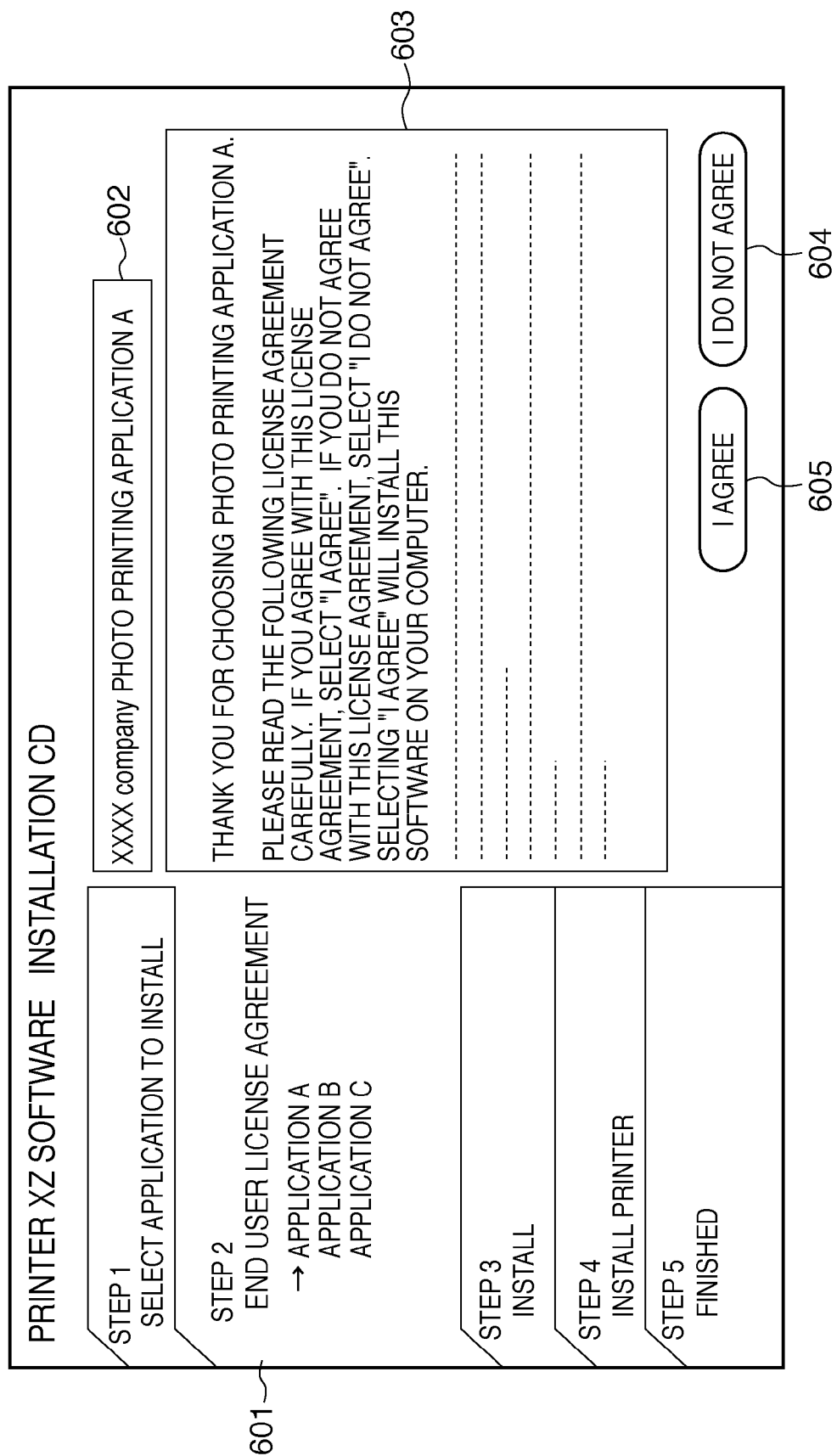
FIG. 6 is a diagram illustrating an example of the display of an end user license agreement according to the first embodiment.

First, in S505, an end user license agreement is displayed for the user. FIG. 6 is a diagram illustrating an example of the display of an end user license agreement according to the first embodiment. Reference numeral 601 indicates which application's end user license agreement is currently displayed. In this example, the end user license agreement of an application A is displayed. Reference numeral 602 is the name of the application currently displayed. Reference numeral 603 is the content of the end user license agreement of the application currently displayed. Reference numerals 604 and 605 are buttons; the user pressing the button 604 indicates that s/he has agreed with the end user license agreement currently displayed. However, the user pressing the button 605 indicates that s/he did not agree with the end user license agreement currently displayed.

Returning to FIG. 5, in S506, the processing waits for the button 604 or 605 to be pressed, and advances to S507 when one of those buttons is pressed; in S507, it is determined whether or not the user has agreed with the end user license agreement. In the case where the user has agreed with the end user license agreement (Yes in S507), the processing advances to S508, where that application is registered in the installed application list, after which the processing advances to S509. However, in the case where the user has not agreed with the end user license agreement (No in S507), the processing advances to S509, skipping S508.

In S509, it is determined whether or not the processing for all the end user license agreements has ended, and if not, the processing returns to S505, and the processing described thus far is repeated. However, if the processing for all the end user license agreements has ended, the end user license agreement collective display process ends.

The abovementioned processing makes it possible to display a single type of end user license agreement just one time, rather than having the same end user license agreement appear several times. Furthermore, registering only the applications for which agreement was obtained in the installed application list makes it possible to set the applications that are actually to be installed.

Figure 7:
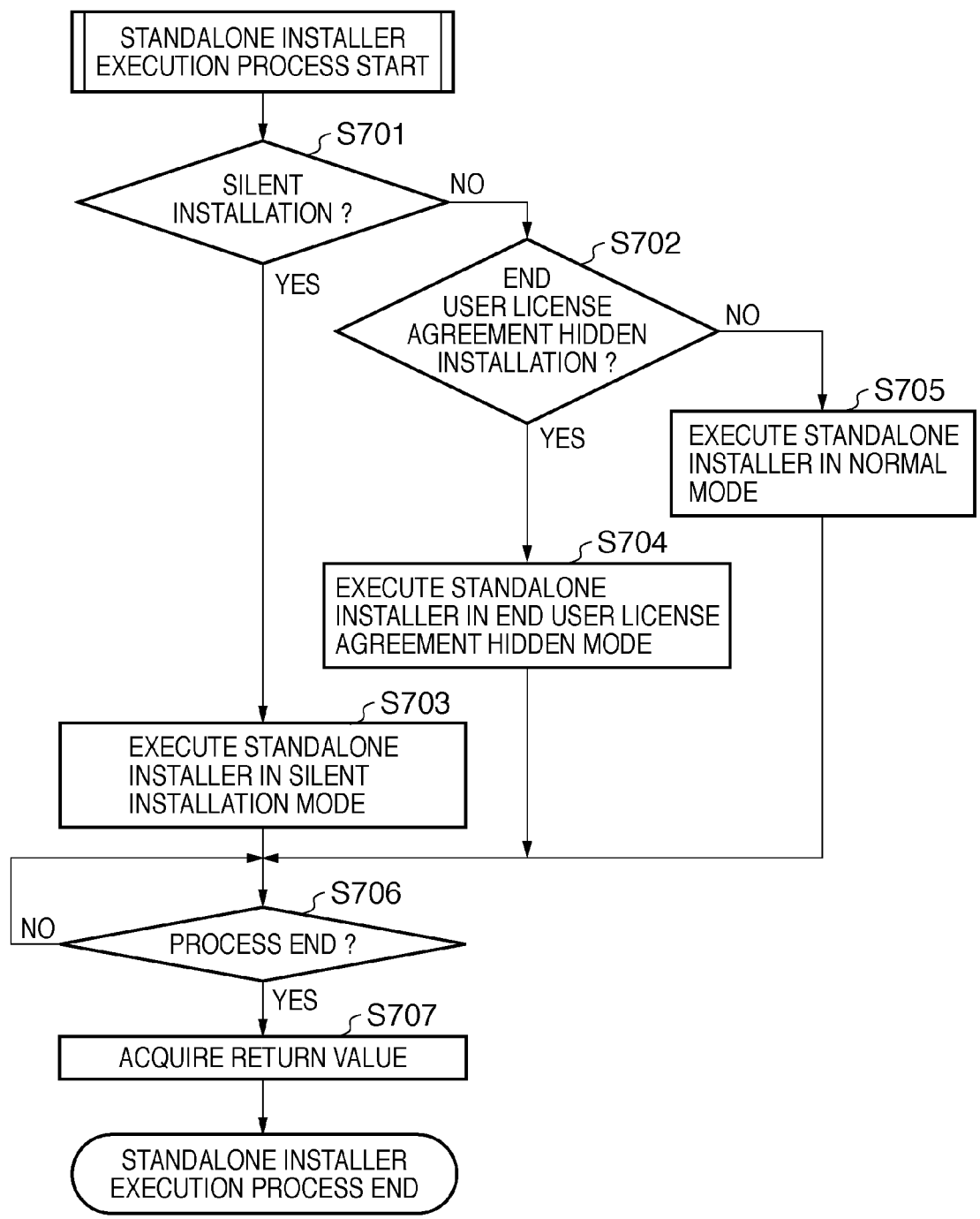
FIG. 7 is a flowchart illustrating a standalone installer execution process according to the first embodiment.

FIG. 7 is a flowchart illustrating a standalone installer execution process according to the first embodiment. First, in S701, it is determined whether or not to execute the installation in silent installation mode based on an argument provided by the process that called the standalone installer execution process. In the case where the argument indicates execution in the silent installation mode (Yes in S701), the processing advances to S703. In S703, the standalone installer is executed in silent installation mode, after which the processing advances to S706.

However, in the case where the argument does not indicate execution in the silent installation mode (No in S701), the processing advances to S702. In S702, it is determined whether or not the argument indicates execution in the end user license agreement hidden mode, and in the case where the argument indicates execution in the end user license agreement hidden mode (Yes in S702), the processing advances to S704. In S704, the standalone installer is executed in the end user license agreement hidden mode, after which the processing advances to S706.

Meanwhile, in the case where the argument does not indicate execution in the end user license agreement hidden mode (No in S702), the processing advances to S705. In S705, the standalone installer is executed in the normal mode, after which the processing advances to S706.

Next, in S706, the processing waits for the process of the standalone installer, in whatever mode is to be executed, to end. After this, when the process of the standalone installer ends (Yes in S706), the processing advances to S707, where the return value is received from the standalone installer and the standalone installer execution process ends.

Figure 8A:
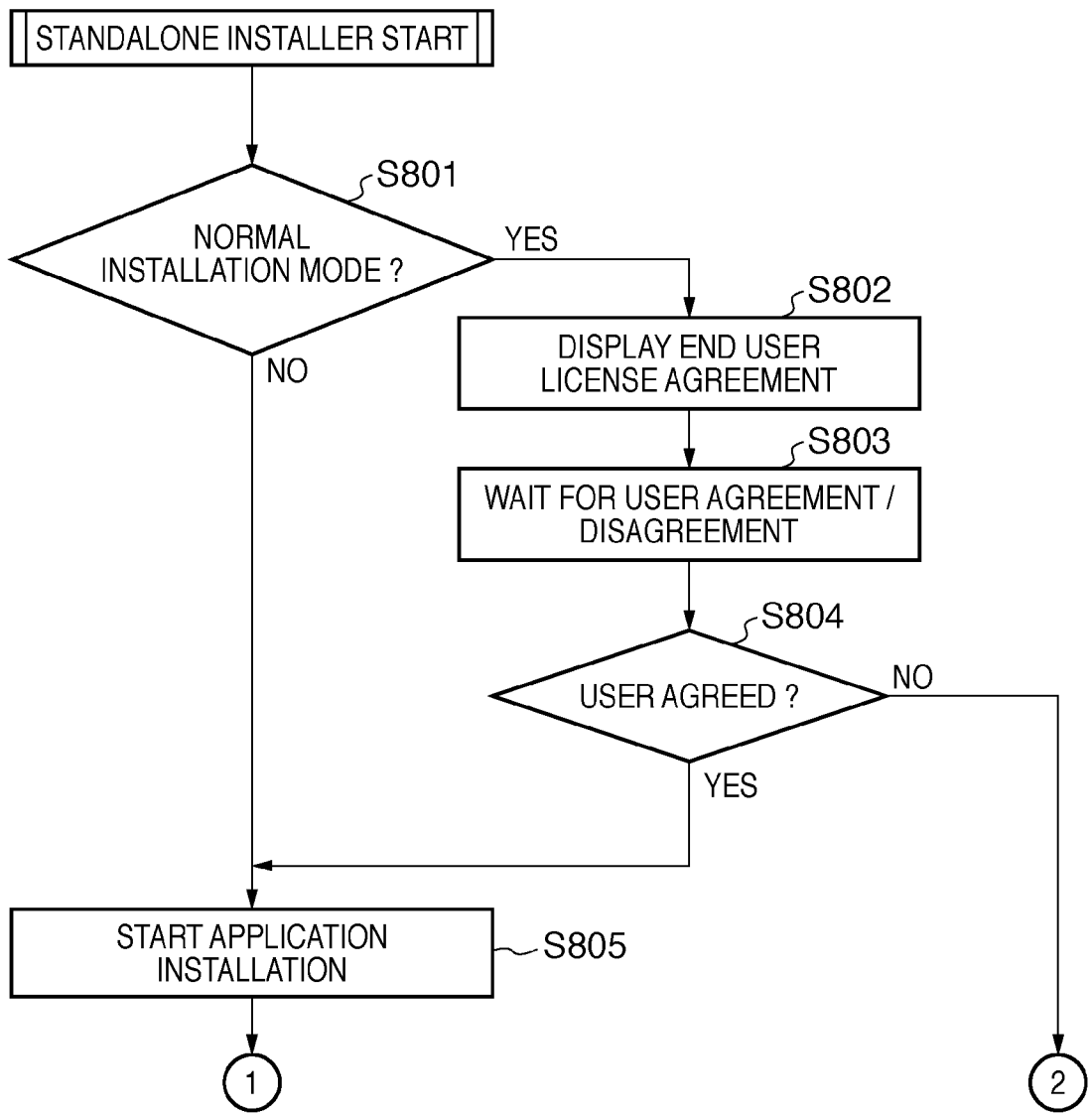
FIGS. 8A and 8B are a flowchart illustrating processing performed by a standalone installer according to the first embodiment.
Figure 8B:
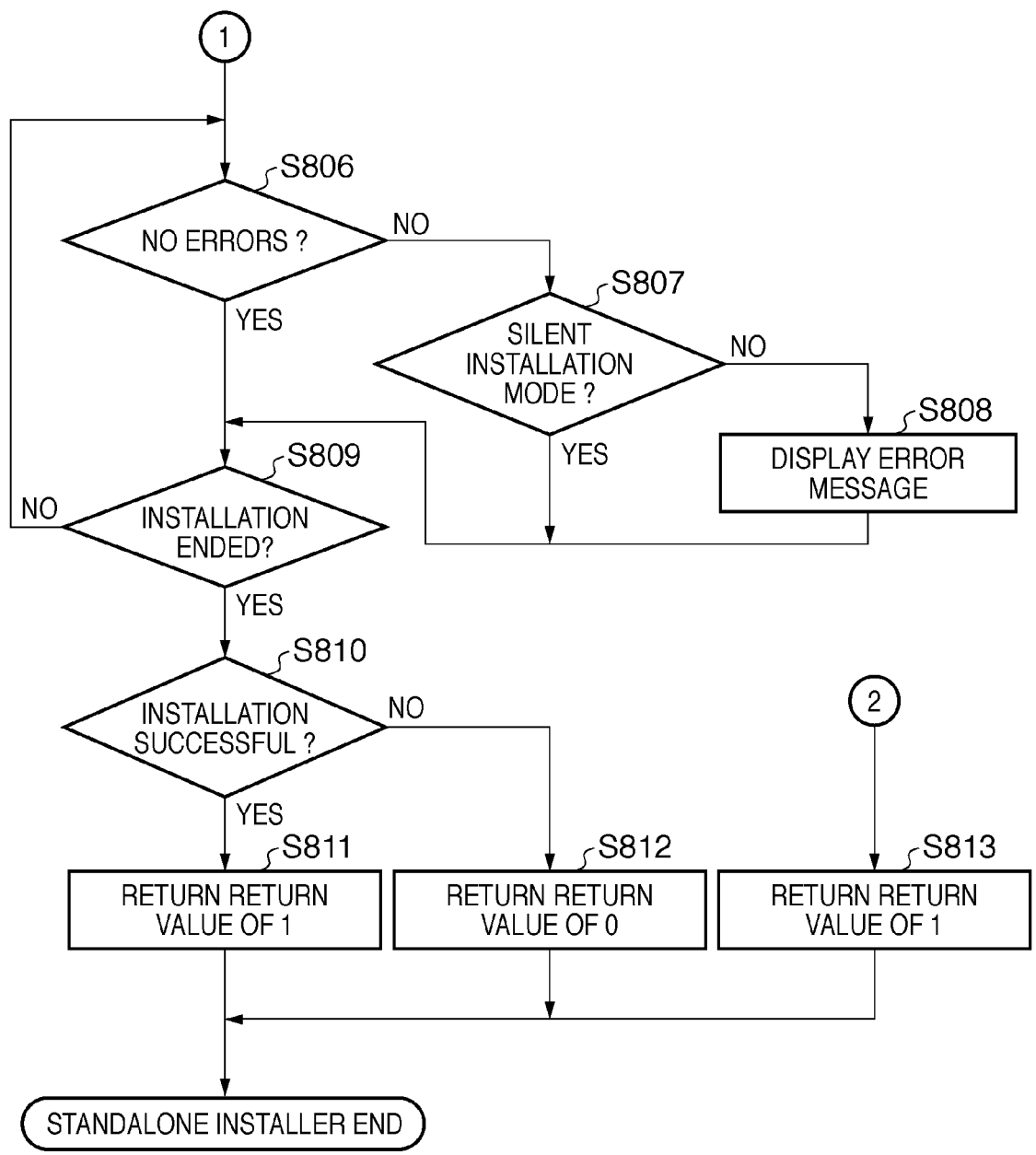

FIGS. 8A and 8B are a flowchart illustrating processing performed by a standalone installer according to the first embodiment. When the processing performed by the standalone installer commences, in S801, it is determined whether or not the installer is to be executed in the normal installation mode. In the case where the result of the determination indicates that the installer is to be executed in the normal installation mode (Yes in S801), the processing advances to S802, where the end user license agreement is displayed.

FIG. 9 is a diagram illustrating an example of the display of an end user license agreement according to the first embodiment. Note that the end user license agreement display may differ among the standalone installers depending on their specifications.

In FIG. 9, reference numeral 901 is the name of the standalone installer. Reference numeral 902 is a display region for the end user license agreement. Reference numerals 903 and 904 are buttons; the user pressing the button 903 indicates that s/he has agreed with the end user license agreement currently displayed. However, the user pressing the button 904 indicates that s/he did not agree with that end user license agreement.

Returning to FIGS. 8A and 8B, in S803, the processing waits for the button 903 or 904 to be pressed, and advances to S804 when one of those buttons is pressed; in S804, it is determined whether or not the user has agreed with the end user license agreement. In the case where the user has agreed (Yes in S804), the processing advances to S805; however, in the case where the user did not agree (No in S804), the processing advances to S813, where a return value of "1" is set and returned to the source of the call. Here, a return value of "1" indicates that the installation has ended without problems. A return value of "1" is returned regardless of the fact that the installation was actually not performed because the processing advancing to S813 indicates that the user has clearly aborted the installation on purpose and it is therefore determined that there are no problems.

However, in the case where the installer is to be executed in the silent installation mode or the end user license agreement hidden mode (No in S801), the processing advances to S805, where the application install process commences. In S806, it is determined whether or not an error has occurred during the execution of the application install process. In the case where an error has occurred (No in S806), the processing advances to S807, where it is determined whether the installation is being executed in the silent installation mode. In the case where the result of the determination indicates the silent installation mode (Yes in S807), the processing advances to S809, whereas in the case where the result indicates that the mode is not the silent installation mode (No in S807), the processing advances to S808, where an error message is displayed. The processing then advances to S809.

Next, in S809, it is determined whether or not all the installation processes have ended, and if all the installation process have not ended, the processing returns to S806, and the processing described thus far is repeated. After this, when all the installation processes have ended (Yes in S809), the processing advances to S810, where it is checked whether or not some sort of error has occurred during the installation. If, as a result, it is determined that no errors have occurred, the processing advances to S811, where a return value of "1" is set and returned. If, however, an error has occurred, the processing advances to S812, where a return value of "0" is set and returned.

Generally, when an application is installed, an end user license agreement is displayed for the user without exception, and the installation is not performed unless the user agrees with the license agreement.

When an installation is executed in the silent installation mode, the end user license agreement is not displayed, and thus the installation cannot be carried out. Furthermore, even if silent installation could be carried out, an error message is not displayed, and thus even if a problem occurs and the installation fails, the user will not be aware of that problem.

With the first embodiment, however, the end user license agreements of multiple applications are collectively displayed in advance prior to the installations actually being performed, and the input operations for agreeing to the end user license agreements are concentrated in one area of the end user license agreement collective display process. It is therefore unnecessary to perform consecutive inputs each time a standalone installer execution process is performed for an application, making it possible to call standalone installers in the silent installation mode.

Furthermore, in the case where some sort of problem occurred during the installation in silent installation mode and the installation failed, re-executing the installation in the normal mode causes the same problem to occur. Through this, the error message that was not displayed in the silent installation mode is displayed once again.

Note that in this case, when a standalone installer is called in the normal mode, the standalone installer end user license screen shown in FIG. 9 will be displayed. This screen has the same content as the collective end user license screen shown in FIG. 6, and thus the user will be required to agree with the same agreement twice.

Accordingly, in the case where an end user license agreement hidden mode is available, re-displaying end user license agreements that have already been displayed is avoided to the greatest extent possible by using the end user license agreement hidden mode.

According to the first embodiment, when an installation fails, a standalone installer that cannot display an error message in the silent installation mode is called once again in the normal mode. This makes it possible to cause the installation to fail for the same reason, thereby displaying the error message.

Second Embodiment

Next, a second embodiment according to the present invention shall be described in detail with reference to the drawings. Note that the hardware and software configurations of the second embodiment are identical to those of the first embodiment, and thus descriptions thereof shall be omitted.

Figure 10:
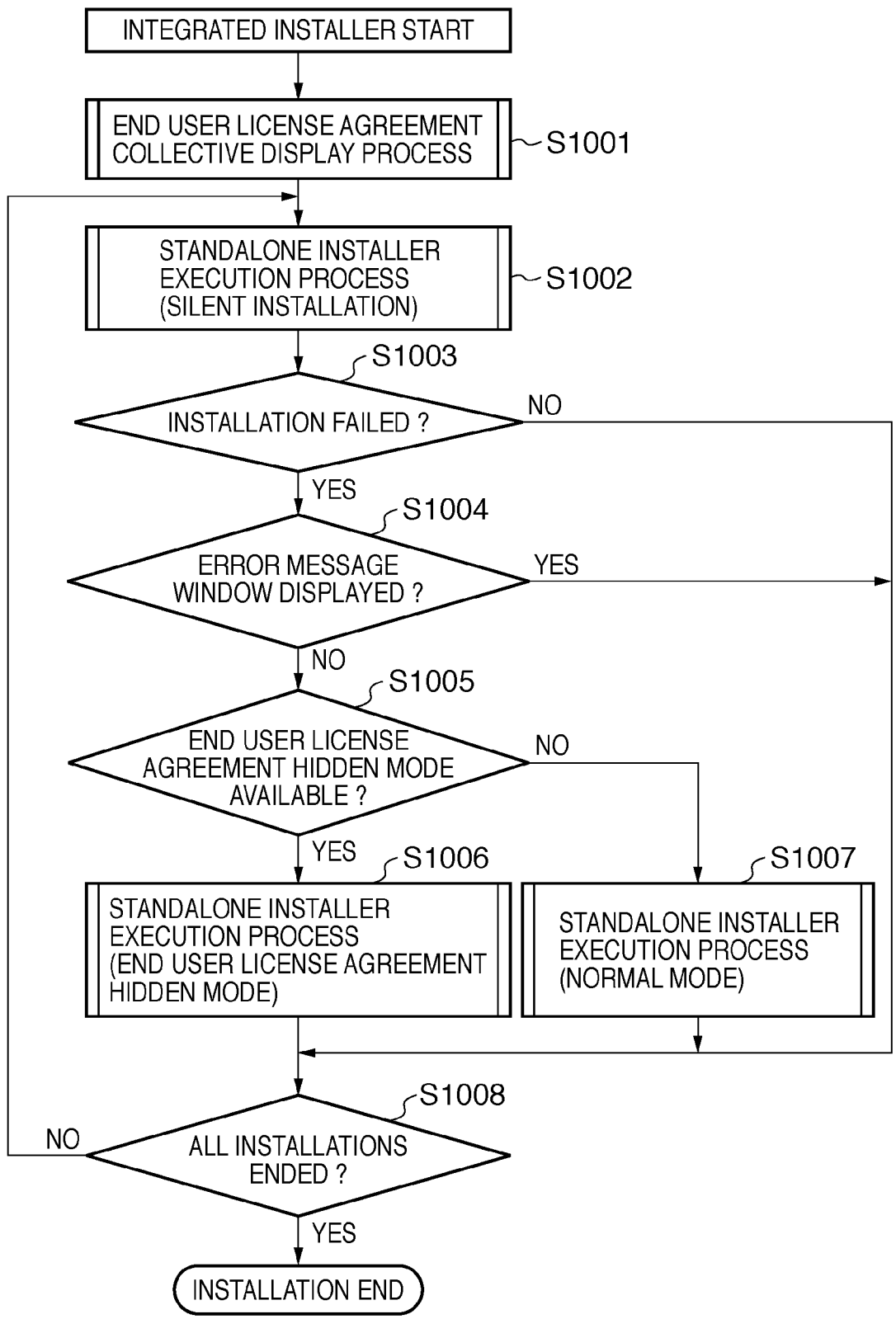
FIG. 10 is a flowchart illustrating a processing procedure of an integrated installer according to a second embodiment.

FIG. 10 is a flowchart illustrating a processing procedure of an integrated installer according to the second embodiment. When the integrated installer 202 is launched, an end user license agreement collective display process is carried out in S1001. As this end user license agreement collective display process is the same as that described in the first embodiment, descriptions thereof shall be omitted. When the applications to be installed are determined as a result of the end user license agreement collective display process, the processing advances to S1002, where a process for executing a standalone installer in a silent installation mode is carried out. The details of this standalone installer execution process shall be given later.

Next, in S1003, it is determined whether or not the installation process of the standalone installer has failed. In the case where the result of this determination indicates that the installation has succeeded, the processing advances to S1008, but in the case where the installation has been identified as having failed, the processing advances to S1004.

In S1004, it is checked whether or not an error message was displayed during the execution process of the standalone installer, and in the case where an error message was displayed, the processing advances to S1008. However, in the case where an error message was not displayed, the processing advances to S1005, where it is checked whether or not the standalone installer has an EULA hidden mode. Here, in the case where the installer has an EULA hidden mode, the processing advances to S1006, and the installation is performed in the EULA hidden mode. However, in the case where the installer does not have an EULA hidden mode, the processing advances to S1007, where the installation is performed in the normal mode.

Next, in S1008, it is determined whether or not all the installations have ended. In the case where there is still a standalone installer that has not been executed, the processing returns to S1002, and the abovementioned processing is repeated. However, in the case where the standalone installers for all the applications have been executed, the integrated installer process ends.

Figure 11A:
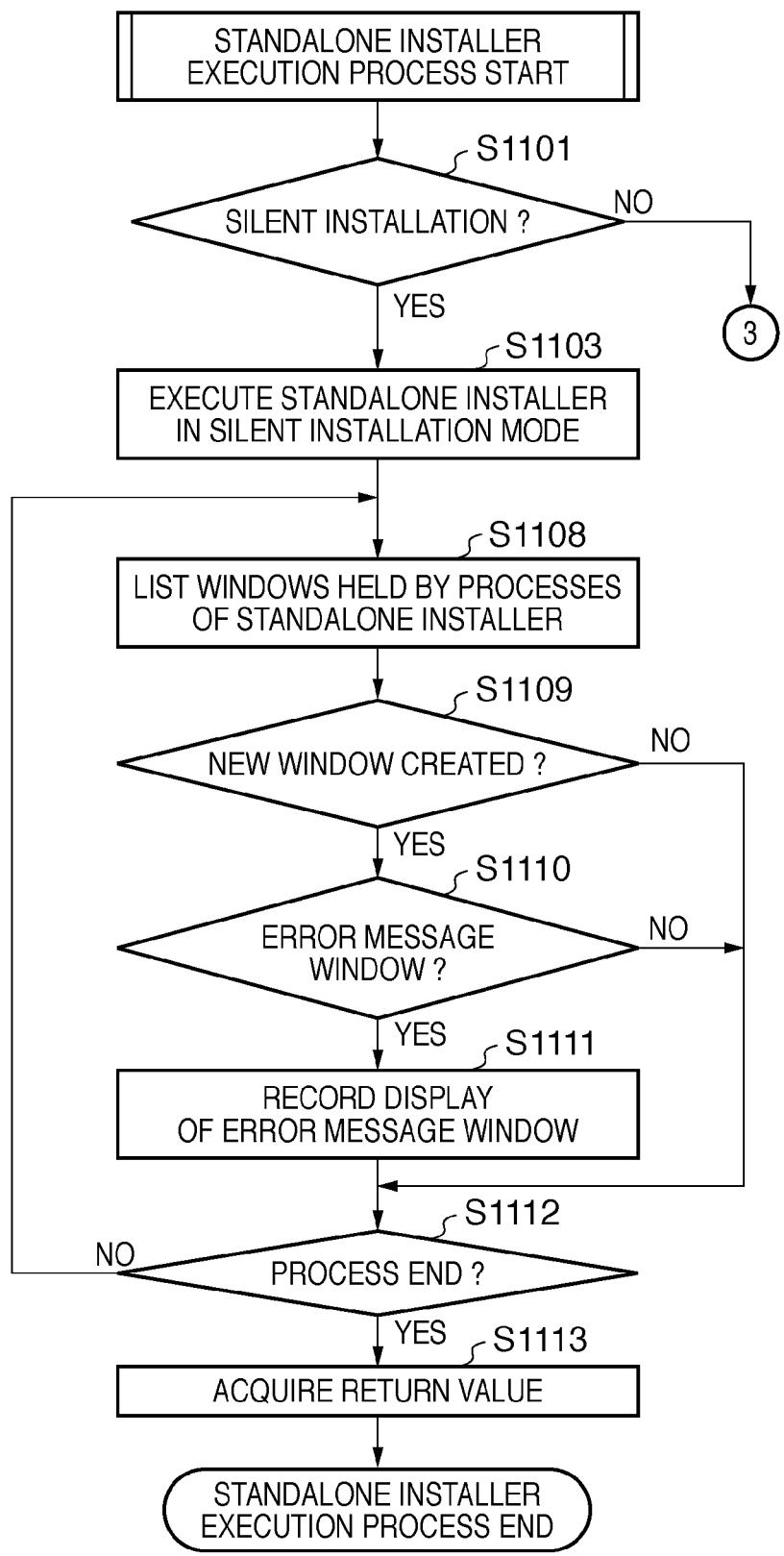
FIGS. 11A and 11B are a flowchart illustrating a standalone installer execution process according to the second embodiment.
Figure 11B:
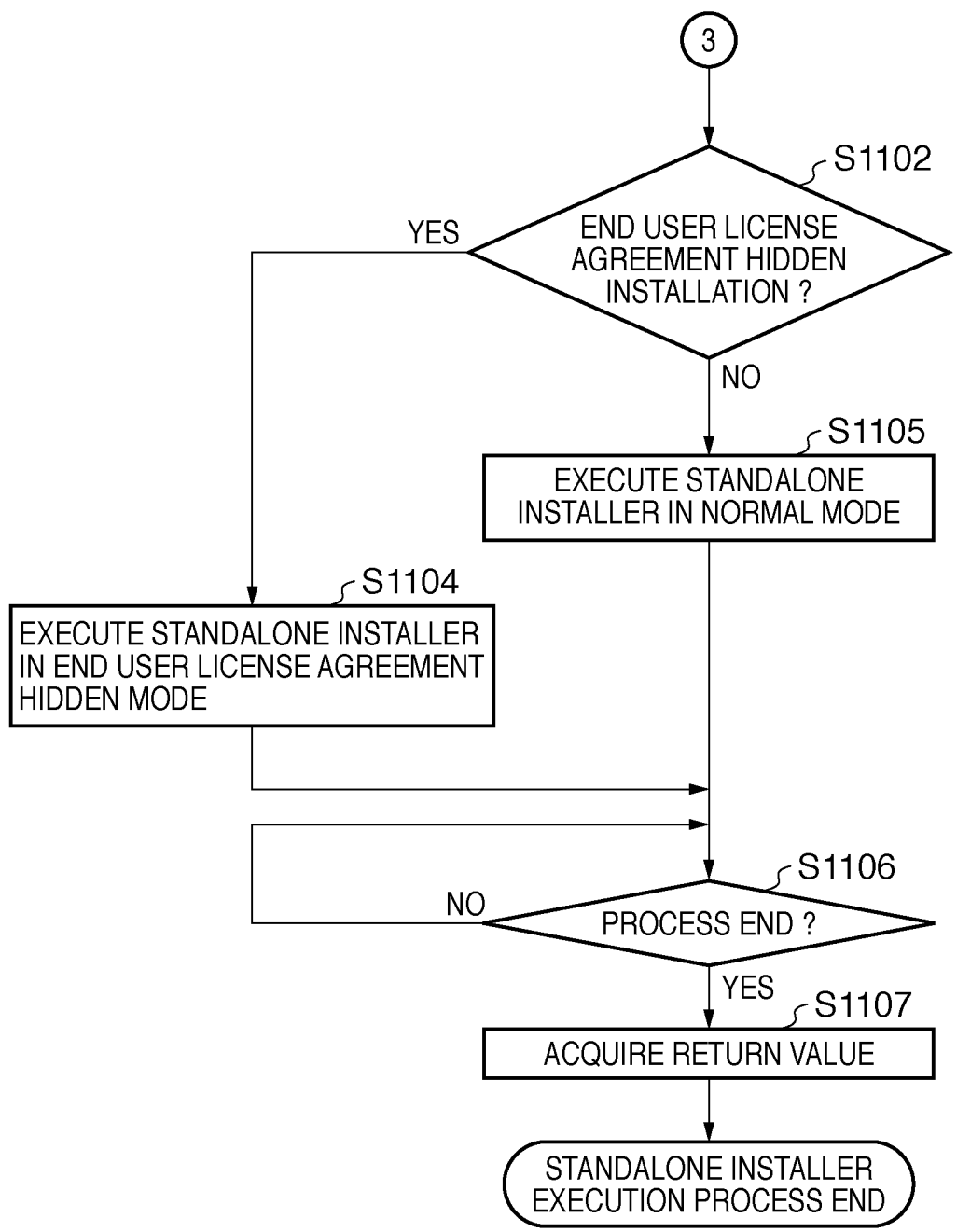

FIGS. 11A and 11B are a flowchart illustrating a standalone installer execution process according to the second embodiment. First, in S1101, it is determined whether or not to execute the installation in silent installation mode based on an argument provided by the process that called the standalone installer execution process. In the case where the argument indicates execution in the silent installation mode (Yes in S1101), the processing advances to S1103. In S1103, the standalone installer is executed in silent installation mode, after which the processing advances to S1108.

However, in the case where the argument does not indicate execution in the silent installation mode (No in S1101), the processing advances to S1102. In S1102, it is determined whether or not the argument indicates execution in the end user license agreement hidden mode, and in the case where the argument indicates execution in the end user license agreement hidden mode (Yes in S1102), the processing advances to S1104. In S1104, the standalone installer is executed in the end user license agreement hidden mode, after which the processing advances to S1106.

Meanwhile, in the case where the argument does not indicate execution in the end user license agreement hidden mode (No in S1102), the processing advances to S1105. In S1105, the standalone installer is executed in the normal mode, after which the processing advances to S1106.

Next, in S1106, the processing waits for the process of the standalone installer, in whatever mode is to be executed, to end. After this, when the process of the standalone installer ends (Yes in S1106), the processing advances to S1107, where the return value is received from the standalone installer and the standalone installer execution process ends.

Meanwhile, in S1108, carried out in the silent installation mode, the windows held by the process of the standalone installer are listed. Then, in S1109, it is determined whether or not a new window has been created based on the windows that have been listed. If a new window has not been created (No in S1109), the processing advances to S1112.

However, in the case where a new window has been created (Yes in S1109), the processing advances to S1110, where it is determined whether or not that window is an error message window. If the result of this determination indicates that the window is not an error message window (No in S1110), the processing advances to S1112.

However, if an error message window has been newly created (Yes in S1110), the fact that an error message window has been displayed is stored, and the processing advances to S1112.

Next, in S1112, it is determined whether the process of the standalone installer running in the silent installation mode has ended, and if the process has not ended, the processing returns to S1108, and the abovementioned processing is repeated. After this, when the process of the standalone installer ends (Yes in S1112), the processing advances to S1113, where the return value is acquired from the standalone installer and the standalone installer execution process ends.

Note that there are some installers that are equipped with the silent installation mode but do not display some error messages, and only display the remaining error messages.

In the second embodiment, monitoring whether or not an error message has been displayed while the standalone installer execution processing is running in the silent installation mode solves the problem that an error message is not displayed despite the fact that the installation has failed.

According to the second embodiment, if an error message is not displayed when a silent installation has failed, the error message can be displayed again by executing the installation in the end user license agreement hidden mode or the normal mode.

Third Embodiment

Next, a third embodiment according to the present invention shall be described in detail with reference to the drawings. Note that the hardware and software configurations of the third embodiment are identical to those of the first embodiment, and thus descriptions thereof shall be omitted.

In the first and second embodiments, when an installation fails, the installation is immediately executed again. However, in the case where re-execution is performed immediately, if, for example, seven applications are to be installed and the installations of the first, third, fifth, and seventh applications fail, normal installations are executed intermittently. This can be extremely irksome for the user.

Accordingly, a scheme can be considered in which rather than re-executing the installation immediately when the installation fails, the applications whose installations have failed are recorded and all applications, up to the seventh application, are installed through silent installation. Thereafter, only the applications whose installations failed are called in the normal installation mode, consolidating the places where the user is to make inputs into one area.

Meanwhile, some standalone installers only have a normal installation mode. In such a case, where the installation is required to be made in the normal installation mode, executing those installations between the other standalone installers that have silent installation modes requires intermittent inputs, increasing the burden on and resulting in annoyance on the part of the user.

In such a case, it is preferable to execute such installations after all the standalone installers executed through silent installation have ended. The third embodiment solves these problems.

FIG. 12 is a diagram illustrating whether or not applications have silent installation modes. Reference numeral 1200 is an application information table. An installer that does not have the silent installation mode is executed in the normal installation mode, and therefore such a standalone installer displays its end user license agreement on its own. For this reason, it is not necessary for the integrated installer to display the end user license agreement, and thus the end user license agreement is absent from the application information table 1200.

Figure 13:
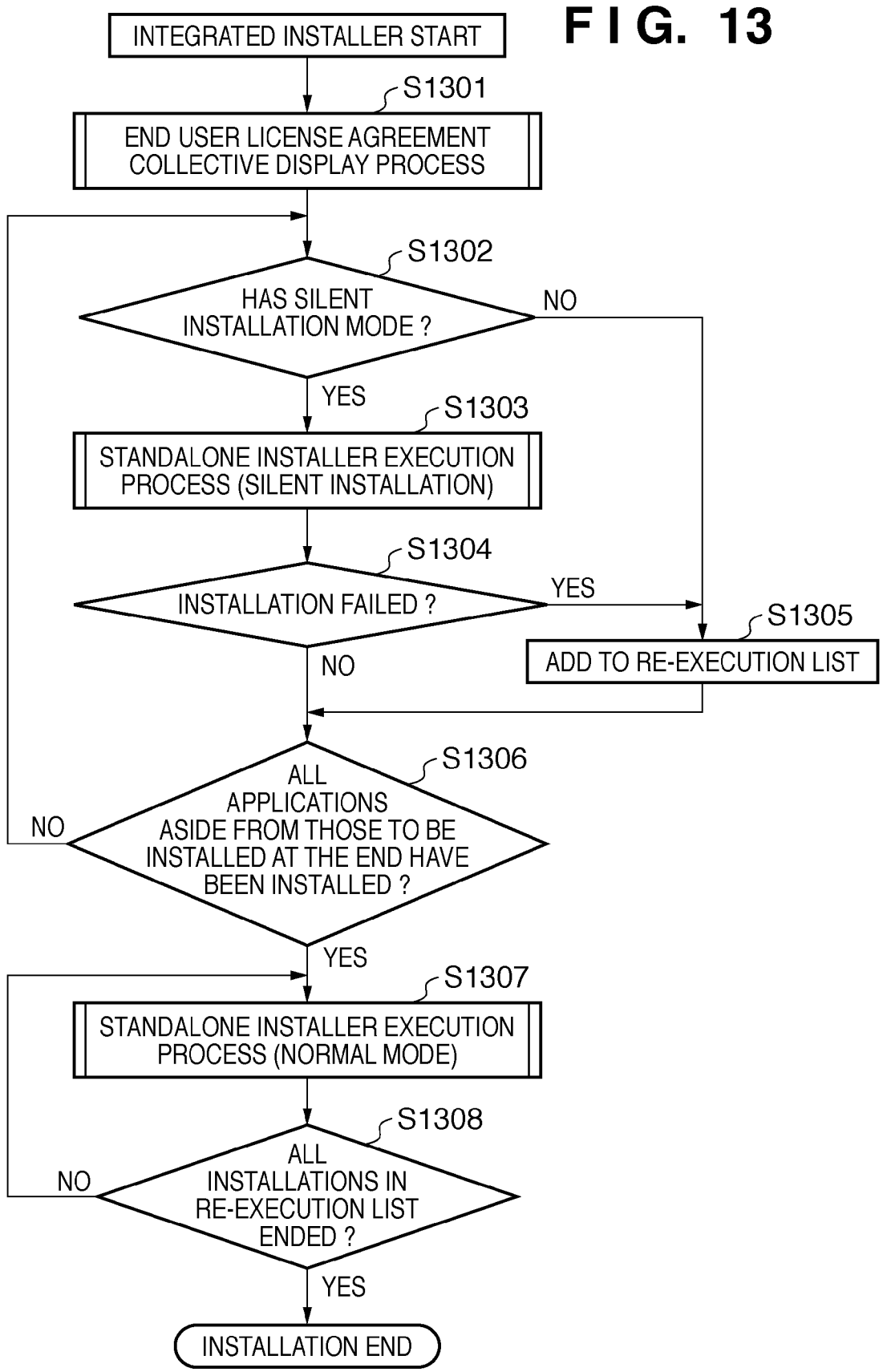
FIG. 13 is a flowchart illustrating a processing procedure of an integrated installer according to a third embodiment.

FIG. 13 is a flowchart illustrating a processing procedure of an integrated installer according to the third embodiment. When the processing of the integrated installer commences, an end user license agreement collective display process is carried out in S1301. As this end user license agreement collective display process is the same as that described in the first embodiment, descriptions thereof shall be omitted. When the applications to be installed are determined as a result of the end user license agreement collective display process, in S1302, whether or not each application has a silent installation mode is checked by referring to the application information table 1200. In the case where the application does not have a silent installation mode (No in S1302), the processing advances to S1305. In S1305, the installation is not carried out; instead, it is added to a re-execution list so that it will be installed later in the normal mode, and the processing advances to S1306.

However, in the case where the application has a silent installation mode (Yes in S1302), the processing advances to S1303, where the execution process for the standalone installer is carried out in the silent installation mode. Because the execution process for the standalone installer is identical to that described in the second embodiment, descriptions thereof shall be omitted here.

Next, in S1304, it is determined whether or not the installation process of the standalone installer has failed. In the case where the result of this determination indicates that the installation has succeeded, the processing advances to S1306, but in the case where the installation has failed, the processing advances to S1305, where the application is added to the re-execution list, after which the processing advances to S1306.

In S1306, it is determined whether all the installations of the applications aside from those in the re-execution list have ended, and if all those installations have not ended, the processing returns to S1302, and the abovementioned processing is repeated. Thereafter, when all the installations of the applications aside from those in the re-execution list have ended, the processing advances to S1307, where the applications that have been added to the re-execution list are executed in the normal installation mode. Then, in S1308, it is determined whether or not the installations of all the applications in the re-execution list have ended, and when all these installations have ended, this processing ends.

In this manner, in the case where the normal installation mode, in which the user is required to make inputs, is necessary, such installations are performed after all silent installations have ended, thereby making it possible to reduce the burden on the user in terms of input and improve the convenience.

Fourth Embodiment

Next, a fourth embodiment according to the present invention shall be described in detail with reference to the drawings. Note that the hardware and software configurations of the fourth embodiment are identical to those of the first embodiment, and thus descriptions thereof shall be omitted.

The fourth embodiment describes a case where Windows® is used as the operating system. In the following descriptions, "start menu" refers to the area in Windows® where a list of applications, programs, and so on is displayed. Furthermore, "start menu name" refers to the name of the application as displayed in the start menu. Finally, "registry" refers to an area in Windows® where information related to the operating system is stored. Storing information into this registry is referred to as "registering" information in the registry.

In addition, in Windows®, the storage location of uninstallers, used to remove installed applications from the computer, is registered in the registry. This is referred to as "registering an uninstaller". "Desktop", meanwhile, refers to the main screen in Windows®. When a certain application is installed, a shortcut for launching that program is often created on the desktop. This "shortcut" indicates the location of the application stored in the hard disk, and in Windows®, using a shortcut makes it possible to indirectly launch an application.

FIG. 14 is a diagram illustrating an application information table that defines how much the used space on a hard disk has increased and what sort of data is created in the system, when applications have been successfully installed. This application information table 1400 is made up of the OS onto which the application is to be installed, the basic increase in used space, and installation confirmation items, for each application identified by an application name. The installation confirmation items are pieces of information based on which it is determined whether or not that particular application is already installed on the OS in question. In this example, these items include the installation path, start menu name, desktop shortcut name, registry into which application is registered, and registry into which uninstaller is registered.

The versions of the operating systems in which the applications can be installed are also included in the application information table 1400. In the fourth embodiment, the application information table 1400 is used to check whether or not installations have succeeded.

Figure 15A:
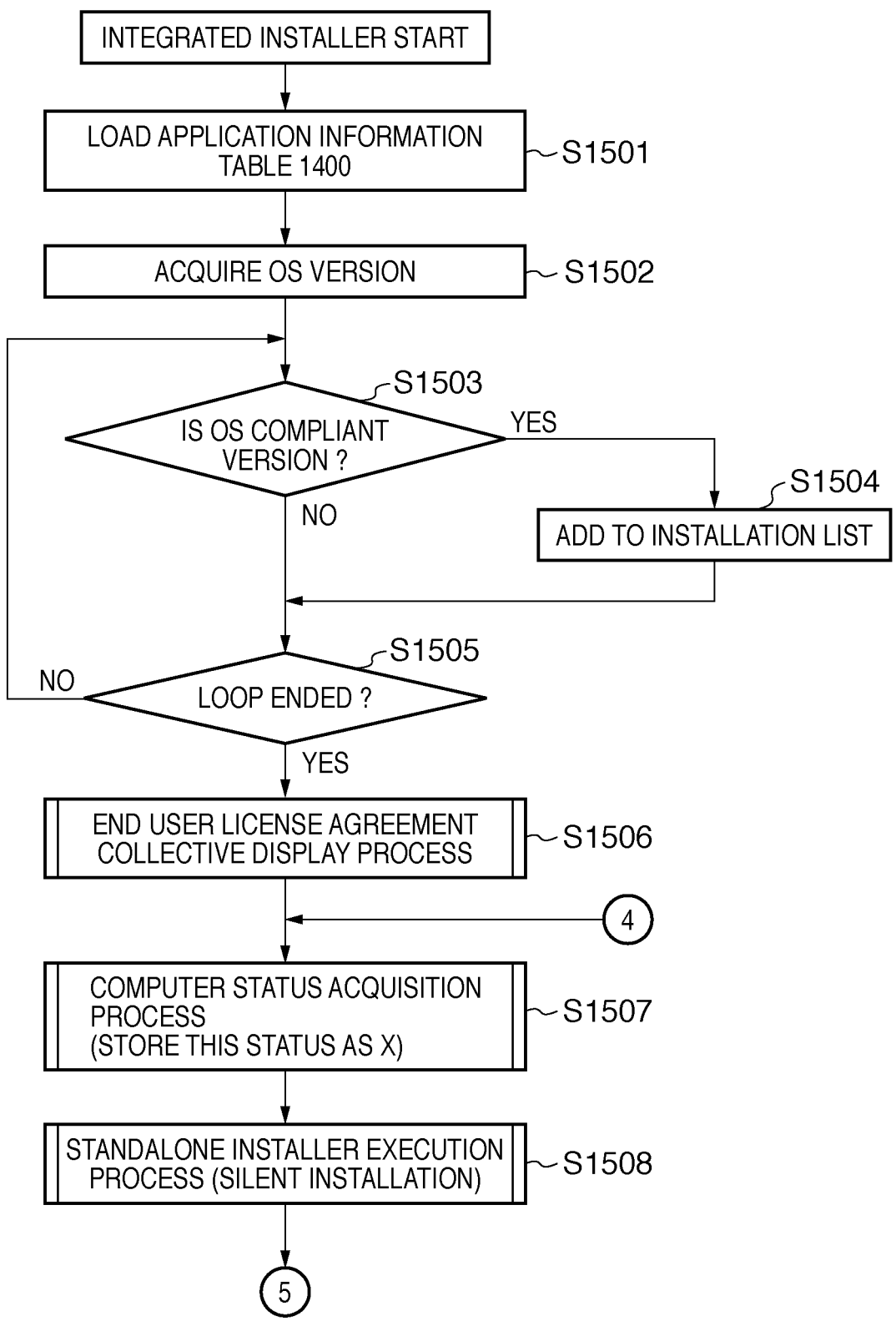
FIGS. 15A and 15B are a flowchart illustrating a processing procedure of an integrated installer according to a fourth embodiment.
Figure 15B:
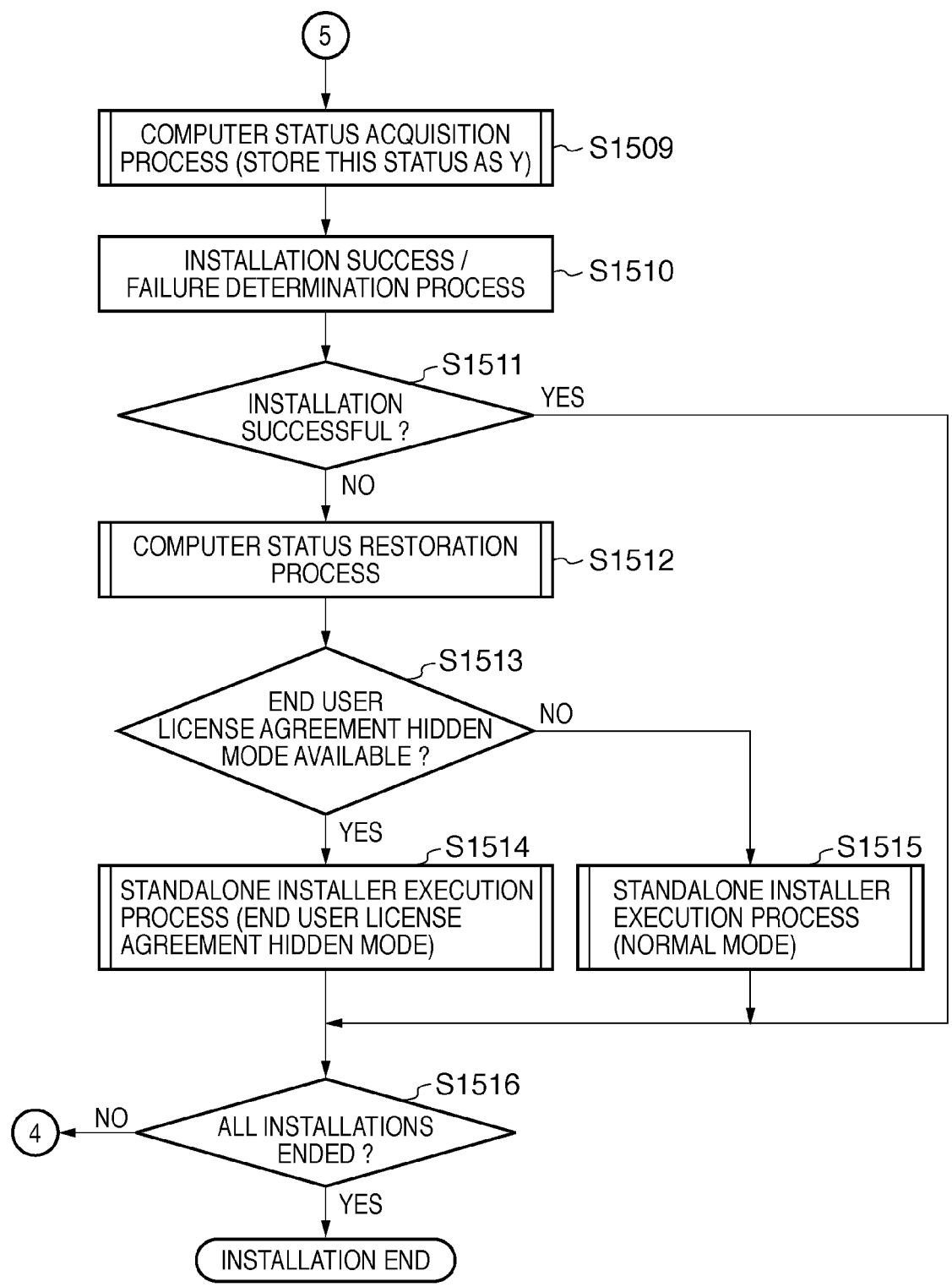

FIGS. 15A and 15B are a flowchart illustrating a processing procedure of an integrated installer according to the fourth embodiment. After the integrated installer has launched, in S1501, the application information table 1400 is loaded. In S1502, the version of the OS under which the integrated installer is currently being executed is acquired, and in S1503, it is checked whether or not the current OS version is included in the OSs compatible with a certain application. If the result of this determination indicates that the current OS is included in the compliant OSs (Yes in S1503), the processing advances to S1504. In S1504, that application is registered in the install list, and the processing then advances to S1505.

However, if the current OS is not included in the compliant OSs (No in S1503), the processing advances to S1505 without adding the application to the install list. Through this, the standalone installers for applications not compatible with the current OS are not executed.

In S1505, it is determined whether or not the OS versions have been checked for all the applications, and if not all the applications have been processed, the processing returns to S1503, and the abovementioned processing is repeated. However, if all the applications have been processed, the processing advances to S1506.

Next, in S1506, the end user license agreement collective display process is performed. As this end user license agreement collective display process is the same as that described in the first embodiment, descriptions thereof shall be omitted. When the applications to be installed are determined as a result of the end user license agreement collective display process, the processing advances to S1507, where a computer status acquisition process is carried out, and the acquired computer status is saved as X. Details regarding this process shall be given later.

Next, in S1508, the execution process for the standalone installer is carried out as a silent installation. Because this process is identical to that described in the first embodiment, descriptions thereof shall be omitted here. Then, in S1509, the computer status acquisition process is carried out again, and the acquired status is saved as a status Y, after which the processing advances to S1510.

In S1510, a determination process for determining whether the installation has succeeded or failed is performed. Details regarding this process shall be given later. If the result of the determination indicates that the installation has succeeded (Yes in S1511), the processing advances to S1516.

However, in the case where the installation has failed (No in S1511), the processing advances to S1512. In S1512, a restoration process for restoring computer information is executed. This process is a process that restores the status of the computer to the status X based on the information acquired in S1507. Then, in S1513, it is checked whether or not that standalone installer has an end user license agreement hidden mode. If the result of this determination indicates that the standalone installer has an end user license agreement hidden mode (Yes in S1513), the processing advances to S1514. In S1514, the installation is carried out in the end user license agreement hidden mode, after which the processing advances to S1516.

However, if the standalone installer does not have an end user license agreement hidden mode (No in S1513), the processing advances to S1515. In S1515, the installation is performed in the normal mode, and the processing advances to S1516.

Then, in S1516, it is determined whether or not the standalone installers for all the applications have been executed. If the result of the determination indicates that all the installation processes have not ended (No in S1516), the processing returns to S1507, and the abovementioned processing is repeated. However, when all the installation processes have ended (Yes in S1516), the processing of this integrated installer ends.

Figure 16:
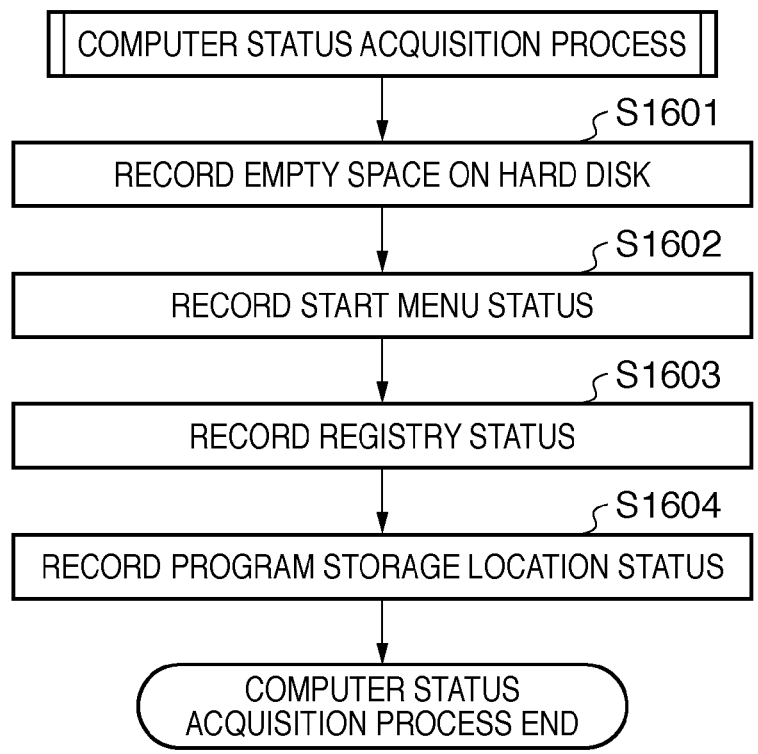
FIG. 16 is a flowchart illustrating a computer status acquisition process according to the fourth embodiment.

FIG. 16 is a flowchart illustrating a computer status acquisition process according to the fourth embodiment. When the computer status acquisition process commences, in S1601, the empty space in the hard disk at that point in time is checked and recorded. Then, in S1602, the status of the start menu at that point in time is checked and recorded. Furthermore, in S1603, the status of the registry at that point in time is checked and recorded. Finally, in S1604, the status of the program storage locations at that point in time is checked and recorded, and the computer status acquisition process ends.

Figure 17:
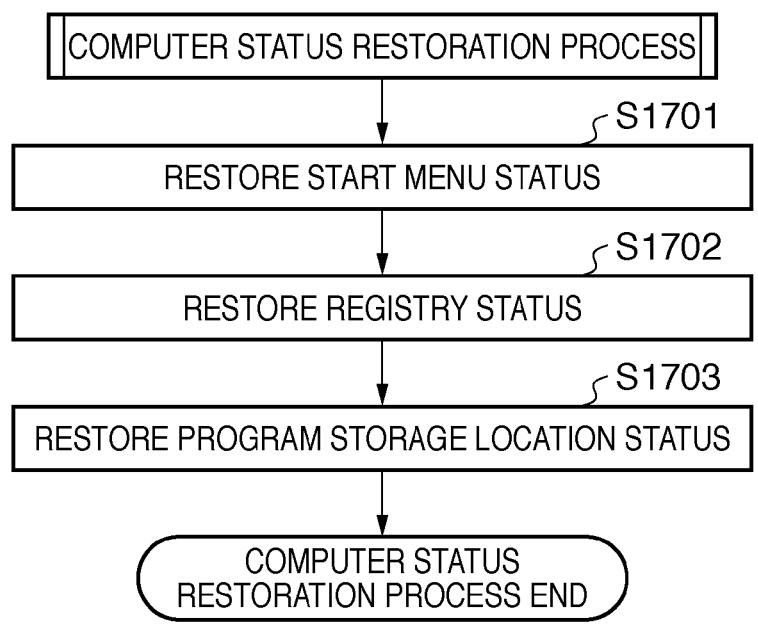
FIG. 17 is a flowchart illustrating a computer status restoration process according to the fourth embodiment.

FIG. 17 is a flowchart illustrating a computer status restoration process according to the fourth embodiment. When the computer status restoration process commences, in S1701, the status of the start menu at that point in time is restored to the recorded status. Next, in S1702, the status of the registry at that point in time is restored to the recorded status. Finally, in S1703, the status of the program storage locations at that point in time is restored to the recorded status, and the computer status restoration process ends.

Figure 18A:
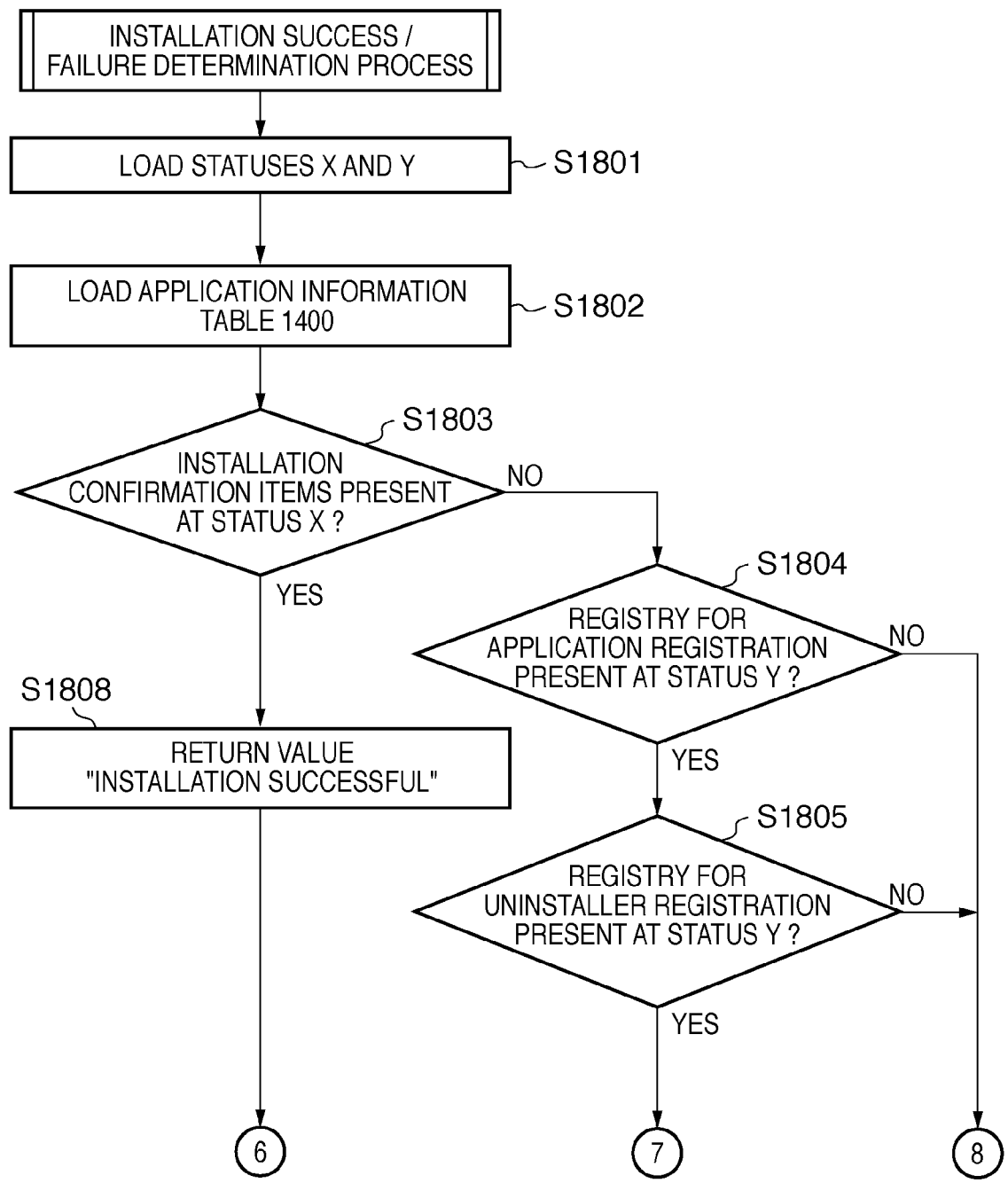
FIGS. 18A and 18B are a flowchart illustrating an installation success/failure determination process according to the fourth embodiment.
Figure 18B:
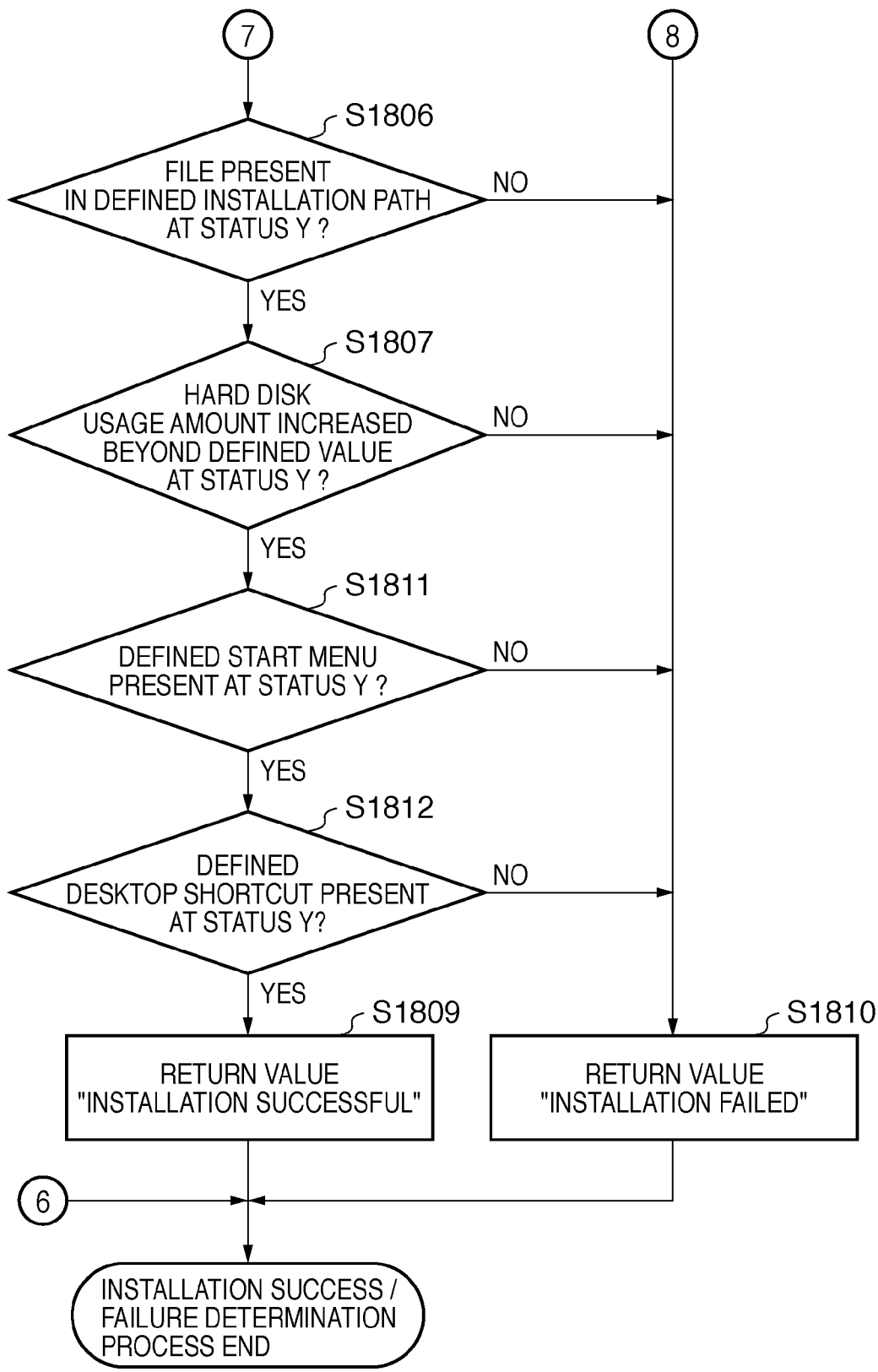

FIGS. 18A and 18B are a flowchart illustrating an installation success/failure determination process according to the fourth embodiment. In S1801, the abovementioned statuses X and Y are loaded. In S1802, the information in the application information table 1400 is loaded, and in S1803, it is checked whether or not an installation confirmation item is present. In the case where all the installation confirmation items are present, it can be determined that the application is in a usable state regardless of whether the execution of the standalone installer succeeded or failed, and thus the processing advances to S1808. In S1808, the return value is set to "installation successful", and the installation success/failure determination process ends.

However, in S1803, in the case where any of the installation confirmation items are missing, the processing advances to S1804. In S1804, it is checked whether or not a registry for performing application registration is present at the status Y, and in the case where such a registry is not present, the processing advances to S1810. When such a registry is present, however, the processing advances to S1805. In S1805, it is checked whether or not a registry for performing uninstaller registration is present at the status Y, and in the case where such a registry is not present, the processing advances to S1810. When such a registry is present, however, the processing advances to S1806.

In S1806, it is checked whether or not a file is present in the install path defined in the application information table 1400 during the status Y, and in the case where such a file is not present, the processing advances to S1810. When such a file is present, however, the processing advances to S1807. In S1807, the processing advances to S1811 in the case where the amount of the hard disk used has increased beyond a defined increased usage amount value from before to after the installation. However, in the case where the value by which the amount actually increased does not exceed the defined increased usage amount value, the processing advances to S1810. In S1811, it is checked whether or not the defined start menu is present during the status Y, and in the case where such a start menu is not present, the processing advances to S1810. When such a start menu is present, however, the processing advances to S1812.

In S1812, it is checked whether or not a defined desktop shortcut is present during the status Y, and in the case where such a shortcut is not present, the processing advances to S1810. When such a desktop shortcut is present, however, the processing advances to S1809. In S1809, the return value is set to "installation successful", and the installation success/failure determination process ends. However, in S1810, the return value is set to "installation failed", and the installation success/failure determination process ends.

There are some standalone installers that do not have means for communicating whether the installation succeeded or failed to the process that called them.

Accordingly, a table that defines how the status of the computer changes in the case where the execution of the standalone installer has succeeded is provided; the status prior to and the status following the execution of the standalone installer are stored therein and compared. This makes it possible to determine whether the installation succeeded or failed without making modifications to provide the standalone installer with a means for communicating the success/failure.

A characteristic of the present invention is that in the case where a silent installation has failed, that standalone installer is executed once again in a form that has a UI; the same error is caused to occur, and thus an error message is caused to be displayed. However, if the status of the computer changes at the time of the first silent installation, there is the chance that the same error will not occur when the standalone installer is executed the second time.

According to the fourth embodiment, after the silent installation fails, the computer is restored to the status it had prior to the execution of the silent installation, and the standalone installer is then called once again; this ensures that the same error will occur.

Note that the present invention may be applied to a system configured of a plurality of devices (e.g., a host computer, an interface device, a reader, a printer, and so on) or to an apparatus configured of a single device (e.g., a copy machine, a facsimile device, and so on).

Furthermore, it goes without saying that the object of the present invention can also be achieved by supplying, to a system or apparatus, a recording medium in which the program code for software that realizes the functions of the aforementioned embodiments has been recorded, and causing a computer (CPU or MPU) of the system or apparatus to read out and execute the program code recorded in the recording medium.

In such a case, the program code itself read out from the computer-readable recording medium implements the functionality of the aforementioned embodiments, and the recording medium in which the program code is recorded composes the present invention.

Examples of the recording medium that can be used to supply the program code include flexible disks, hard disks, optical disks, magneto-optical disks, CD-ROMs, CD-Rs, magnetic tape, non-volatile memory cards, ROMs, and so on.

Moreover, it goes without saying that the following case also falls under the scope of the present invention, which is not limited to implementing the functions of the aforementioned embodiments by a computer executing the read-out program code. That is, the case where an operating system (OS) or the like running in a computer performs part or all of the actual processing based on instructions in the program code, and the functionality of the aforementioned embodiments is realized by that processing, is included in the scope of the present invention.

Furthermore, the program code read out from the recording medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiments may be implemented through that processing. It goes without saying that this also falls within the scope of the present invention.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-143622, filed May 30, 2008, which is hereby incorporated by reference herein in its entirety.

What is claimed is:

1. An information processing apparatus comprising:
an execution unit that executes silent installation of a program;
a first determination unit that determines whether or not an error message was displayed during the silent installation;
a second determination unit that determines a result of the silent installation of the program after the silent installation of the program;
a re-execution unit that, in a case where the first determination unit determines that an error message was not displayed during the silent installation and the second determination unit determines that the silent installation of the program has failed, executes an installation of the program in a mode that displays an error message in the display device; and
a third determination unit that determines whether or not the program has an agreement hidden mode that an agreement is not displayed;
wherein the execution unit executes the silent installation of the program in the agreement hidden mode, and
wherein, in a case where an error message was not displayed during the silent installation and the silent installation of the program has failed, an installation of the program is executed in a mode that displays an error message in the display device and the agreement hidden mode in the re-executing step.

2. The apparatus according to claim 1, further comprising:
a storage unit that stores the status of the information processing apparatus prior to the silent installation of the program by the installer; and
a restoration unit that restores the status of the information processing apparatus stored in the storage unit, before the installation is executed by the re-execution unit.

3. The apparatus according to claim 1, wherein the execution unit executes the installer in the mode that displays the error message in the display device in the case where the installer is not compliant with the silent installation.

4. An installation method for an information processing apparatus, the method comprising:
executing silent installation of a program;
determining whether or not an error message was displayed during the silent installation;
determining a result of the silent installation of the program after the silent installation of the program;
re-executing, in a case where an error message was not displayed during the silent installation and the silent installation of the program has failed, an installation of the program in a mode that displays an error message in the display device; and
determining whether or not the program has an agreement hidden mode that an agreement is not displayed;
wherein the executing includes executing the silent installation of the program in the agreement hidden mode, and
wherein, in a case where an error message was not displayed during the silent installation and the silent installation of the program has failed, an installation of the program is executed in a mode that displays an error message in the display device and the agreement hidden mode in the re-executing step.

5. The method according to claim 4, further comprising:
storing the status of the information processing apparatus prior to the silent installation of the program by the installer; and restoring the status of the information processing apparatus stored in the storage step, before the installation is executed in the re-execution step.

6. The method according to claim 4, wherein the installer is executed in the executing step in the mode that displays the error message in the display device in the case where the installer is not compliant with the silent installation.

7. The method according to claim 4, further comprising:
determining whether or not the program has an agreement hidden mode that an agreement is not displayed; and
wherein the silent installation of the program is executed in the executing step in the agreement hidden mode,
wherein, in a case where an error message was not displayed during the silent installation and the silent installation of the program has failed, an installation of the program is executed in a mode that displays an error message in the display device and the agreement hidden mode in the re-executing step.

8. A non-transitory computer-readable storage medium storing a program that when executed by a computer, causes the computer to execute an installation method for an information processing apparatus, the method comprising:

executing silent installation of a program;
determining whether or not an error message was displayed during the silent installation;
determining a result of the silent installation of the program after the silent installation of the program;
re-executing, in a case where an error message was not displayed during the silent installation and the silent installation of the program has failed, an installation of the program in a mode that displays an error message in the display device; and
determining whether or not the program has an agreement hidden mode that an agreement is not displayed;
wherein the executing includes executing the silent installation of the program in the agreement hidden mode, and
wherein, in a case where an error message was not displayed during the silent installation and the silent installation of the program has failed, an installation of the program is executed in a mode that displays an error message in the display device and the agreement hidden mode in the re-executing step.

\* \* \* \* \*